Jan. 16, 1962     J. T. ARMBRUSTER     3,016,793
OPTICAL PROJECTORS

Filed Feb. 3, 1959     3 Sheets-Sheet 1

INVENTOR
JOHN T. ARMBRUSTER
BY
Herbert C. Kimball
ATTORNEY

INVENTOR
JOHN T. ARMBRUSTER
BY Herbert C. Kimball
ATTORNEY

United States Patent Office 3,016,793
Patented Jan. 16, 1962

3,016,793
OPTICAL PROJECTORS
John T. Armbruster, Niagara Falls, N.Y., assignor to American Optical Company, Southbridge, Mass., a voluntary association of Massachusetts
Filed Feb. 3, 1959, Ser. No. 790,928
3 Claims. (Cl. 88—24)

This invention relates to optical projectors, and is more particularly concerned with the positioning of the optical axis of the optical objective. It is the general practice, where a projector is moved about so as to call for different arrangements of projector and screen, to make provision for modifying the angle by which the optical axis of the objective deviates from the horizontal, or in simpler language to make provision for centering the projected image on the screen. The present invention provides a self-conforming support for the projector which permits the operator to manipulate the projector so as to center the projected image on the screen and then leave the projector in adjusted position.

In the drawings which illustrate my invention:

FIG. 4 is a detail section view on the line 4—4 in FIG. 3 illustrating the operation of the tension spring which acts on the elevator leg so as to render it a self-conforming support, and FIG. 5 is a view in front elevation of the mount for the projection objective.

Figure 1:
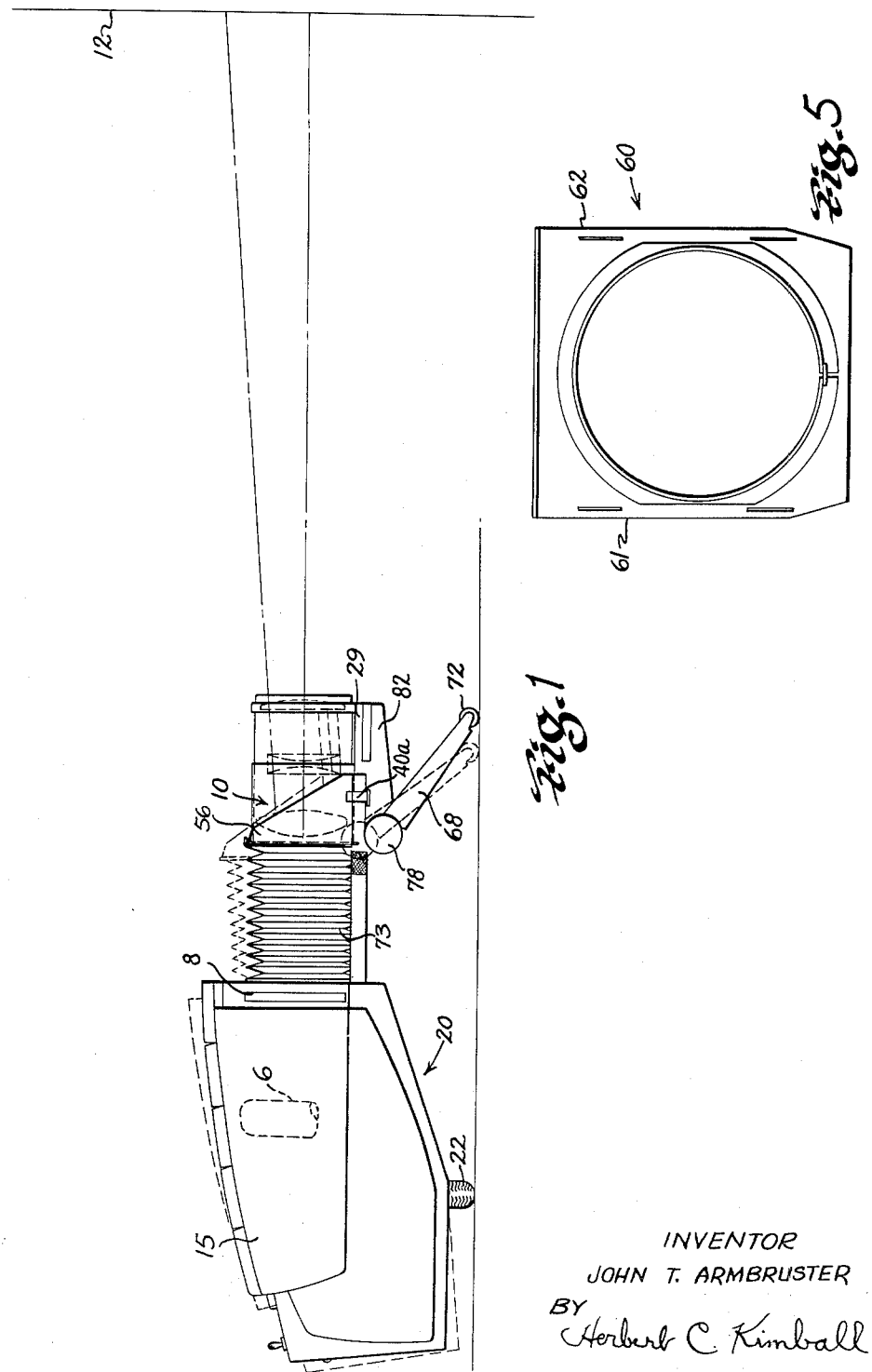
FIG. 1 is a diagrammatic view showing a typical inclination of the optical axis of the projection objective to center the image on the screen.

Various expedients have been proposed for shifting the optical axis of a projector so that the operator may center the projected image on the screen. The most obvious expedient, a screw for raising or lowering the forward end of the projector, is slow and tedious in operation. Other expedients have been suggested which are intended to speed up the operation of centering the projected image, but they involved manipulation of holding screws or the like, as the support is not self-conforming as is true with the present invention of which the figures of the drawing show an illustrative embodiment.

For purposes of showing such an embodiment I have selected a slide projector, although the invention is equally applicable to a projector in which the illumination is such as to provide episcopic projection of opaque material. In the embodiment shown in FIGS. 2, 3 and 4 a lamp 6 provides illumination for the slide 8 which is to be imaged by the objective lens system 10 on the screen 12. It is customary to provide a lamp housing 15 and to pass cooling air through the interior of this housing and over the material being projected, such as the slide 8, by means of a fan 17, such cooling forming no part of the present invention. These and such other members of the optical projector as are deemed desirable are supported by a base 20 which is adapted to tilt about a pair of contacts 22 positioned adjacent the rear of the base.

A simple form of supporting base 20 is shown in the drawings, comprising a pair of hollow rods or sleeves 25 and 26 and an underslung framework 31 which maintains the sleeves 25 and 26 spaced substantially from the table or platform on which the projector is placed. The contacts 22 are carried by this framework 31 as being the lowest portion of the base 20, and therefore these contacts 22 act as a pivot about which the hollow rods or sleeves 25 and 26 tilt when the operator is centering the projected image. When, as in the particular embodiment shown, there is a ventilating fan 17, it may be stowed inside of the framework 31 with its motor 28 carried by the hollow rods 25 and 26. The housing 15 will of course enclose the fan 17 and assist in causing the cooling air to flow to the heated areas.

The sleeves 25 and 26 function as an optical bench facilitating the accurate and convenient assembly of the projector. As is well known, such sleeves contribute to the ease of obtaining the proper spacing of the lamp 6 and its accessories such as the reflector 33 and condenser 35. Moreover the sleeves 25 and 26 telescope with a second pair of hollow rods 29 and 30 which extend forwardly far enough to carry a support 37 for the objective lens system 10, this support being movable relative to the sleeves 25 and 26 in focusing the lens system.

Figure 2:
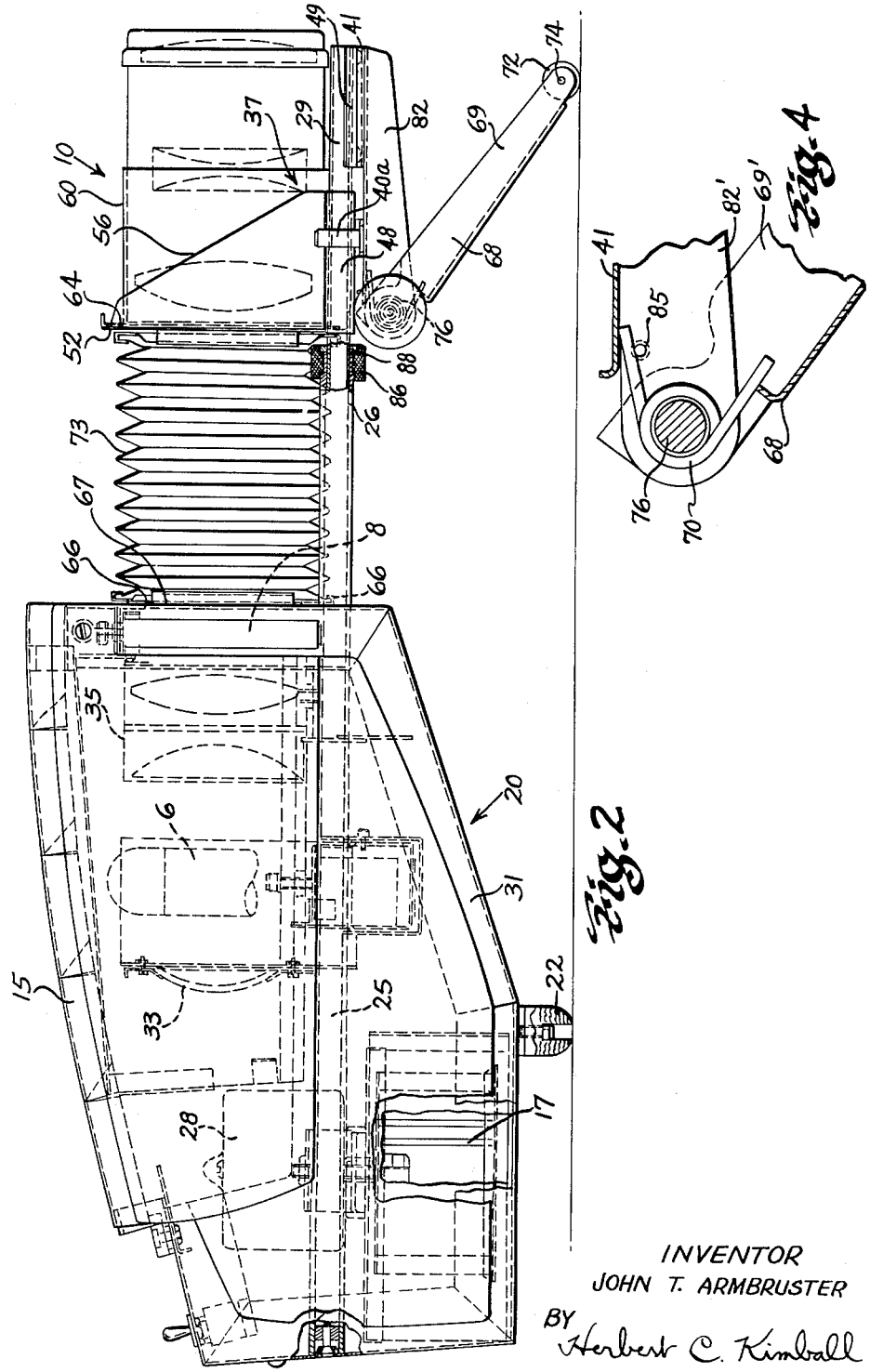
FIG. 2 is a view in side elevation of the optical projector, with parts broken away to more clearly show the construction.
Figure 3:
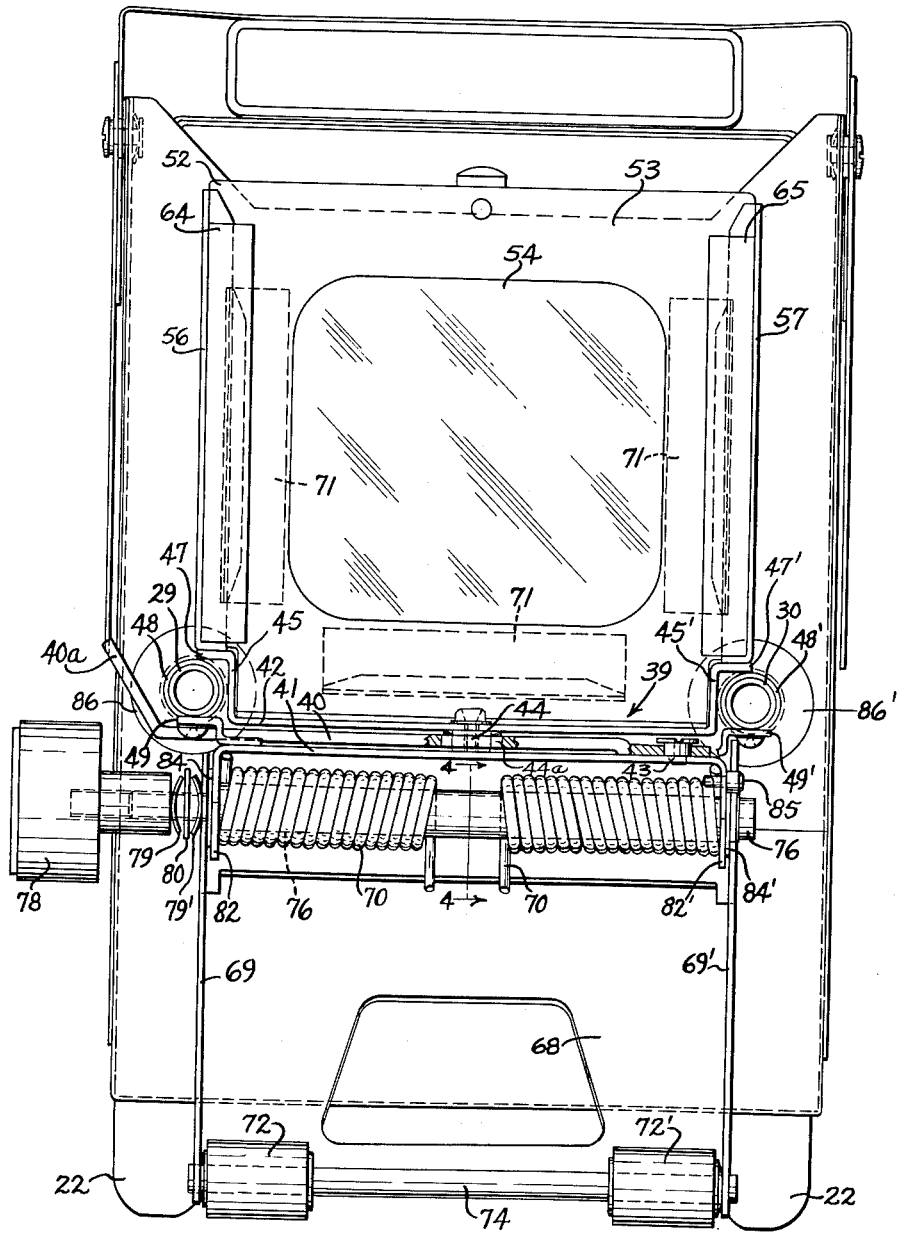
FIG. 3 is a view in front elevation of the optical projector looking from the right in FIG. 2, the projection objective and its mount being omitted.

Referring to FIGS. 2 and 3, it will be seen that the bed 39 of support 37 extends forwardly bounded on the two sides by the hollow rods 29 and 30. This bed 39 is made up of a lower plate 41 connected to an upper plate 42 by a lever 40 having a manual portion 40a. The end of the lever 40 opposite the manual portion 40a is connected to the lower plate 41 by a pivot 43. Centrally of the plate 42 is a second pivot 44 operating in a short slot 44a in the lever 40. When the manual portion 40a is advanced or retracted (see FIG. 2), the pivot 43 acts as a fulcrum, and the pivot 44 carried by the plate 42 is advanced or retracted so as to adjust the position of the plate 42 forwardly or backwardly relative to the plate 41, thereby effecting slight adjustments of the objective lens system 10 carried thereby. The upper plate 42 is bent upwardly on each side as an upturned flange 45, 45' which terminates on each side in a horizontal flange 47, 47'. A pair of sleeves 48, 48' are slidable on the hollow rods 29, 30, the flanges 45, 45' and 47, 47' being welded to these sleeves 48, 48', so that the manipulation of the lever 40 results in the sliding of the upper plate 42 and its bearing sleeves 48, 48' on the hollow rods 29, 30.

The lifting thrust of the elevator leg 68, later to be described is taken by a pair of shoes 49, 49' welded one on either side of the forward portion of the lower plate 41. These shoes 49, 49' are secured to the undersides of the forward portions of the hollow rods 29, 30 and transmit the upward thrust from the leg 68 to these rods 29, 30. Accordingly, as the rods 29, 30 are pulled out from the sleeves 25 and 26 to lengthen the separation of the lens system 10 from the slide 8, the upward thrust of the elevator leg 68 affords a support for the forward end of the optical bench.

The lateral flanges 45, 45' and more particularly the horizontal portions 47, 47' support a vertical framework 52 comprising a transverse wall 53 having an aperture 54 through which the bundles of image forming rays pass to the lens system 10, as well as a pair of bracing walls 56 and 57. The mount 60 for the objective lens system 10 is separable from the projector, and is provided with lateral flanges 61 and 62 for engaging in vertical slots 64 and 65 provided on the inwardly facing sides of the bracing walls 56 and 57. It will be apparent therefore that when the mount 60 is assembled with the support 37 by lowering the flanges 61 and 62 in the vertical slots 64 and 65, the lens system may be pushed forward or back along the optical bench to effect the proper adjustment of focus of the lens system. The forward end of the housing 15 provides guides 66 on the sides and bottom of an opening 67 in front of the condenser 35. Similar guides 71 are provided on the back of the vertical framework 52. The guides 66 and 71 are for assembly of the bellows 73 which functions in the well known manner to connect the housing 15 in light-tight relation with the objective lens system 10 and permits the focusing of the latter.

The bench is tiltable by the operator about the contacts 22, as previously mentioned; and to complete the self-conforming support an elevator leg 68 is pivoted relative to the bench and is biased by one or more coil springs 70 in the direction for tilting upwardly the forward end of the bench. In the embodiment shown, the leg 68 is formed of sheet stock extending transversely of the bench and having the edge portions 69, 69' bent forwardly to act as stiffeners. Furthermore an axle 74 extends between the two lower ends of the stiffeners 69, 69' and carries a pair of rollers 72, 72'. The leg 68 is not connected directly to the bench but its edges 69, 69' are pivotally mounted on a shaft 76 carried by the bed 39, so that as the support 37 together with the objective lens system 10 are moved forward or back by sliding the hollow rods 29 and 30 out and in relative to the sleeves 25 and 26, the weight of the forward portion of the projector is on the rollers 72, 72'.

The spring or springs 70 engage at one end the leg 68 and at the other end the plate 41 and are selected to be strong enough to substantially counterbalance the weight of this forward portion of the projector. When the operator raises or lowers this forward portion so as to tilt the projector about the contacts 22, the counterbalancing springs 70 tend to retain the axis at the selected angle of tilt. The support for the projector is, in other words, self-conforming.

If a selected angle of tilt is to remain fixed, the operator can prevent pivoting of the leg 68 by turning a knob 78 which is threaded on the end of shaft 76 and thereby compress against the side portion 69 of the leg 68 a pair of dished washers 79, 79', one to either side of a flat washer 80. The lower plate 41 of the bed 39 has downwardly turned side flanges 82, 82' in which the shaft 76 is rotatably mounted. The side portions 69, 69' of the leg 68 overlap the flanges 82, 82', with a friction washer 84, 84' interposed between each side portion and overlapping flange. By compressing the washers 79, 80, 79' against the side portion 69, the washer 84 is tightly compressed between the portion 69 and the flange 82 so as to resist further pivotal movement of leg 68. There is in addition a fixed stop 85 (see FIG. 4) carried by the flange 82' which cooperates with the upper extremity of side portion 69' to limit the extent to which the leg 68 may be brought back under the shaft 76.

The way in which the projector is manipulated by the operator to center the projected image on the screen is readily apparent from the foregoing description. The operator can lift the forward portion of the base 20 and in doing so he finds that the springs 70 lift with him. Or he can depress the projection axis by lowering the forward portion of base 20 against the pressure of the springs 70. In either case, when he ceases to lift or depress, the base remains in the position to which he has adjusted it. Such a self-conforming support for a projector is unusually simple, convenient and rapid in adjustment, and can be operated where the lighting is at a minimum. Moreover, where it is desirable to move the support 37 in one direction or the other by changing the telescoping of the hollow rods 29 and 30 with the sleeves 25 and 26 of the optical bench in focusing the objetcive lens system 10, the rollers 72, 72' carry the full weight of the forward portion of the projector as the objective 10 on its support 37 is advanced or retracted. When the desired movement has been made, the telescoping of the hollow rods 29 and 30 in the sleeves 25 and 26 may be held stationary by means of nuts 86, 86' which are threaded on the forward ends of the sleeves 25 and 26 (see FIG. 2). When these nuts are tightened they distort friction washers 88 between the nuts and the respective rods so as to clamp the rods in adjusted position. My invention contributes substantially to the ready manipulation of an optical projector as the operator focuses the objective lens system, and centers the projected image on the screen.

I claim:

1. In an optical projector, a base adapted to support the projector in the position to which the base is tilted comprising a frame-work, a pair of contacts beneath said frame-work about which said frame-work is adapted to tilt, a leg pivotally carried on a transverse axis by the forward portion of said base for supporting the forward portion of said base at increasingly higher elevations relative to said pair of contacts as said leg is swung about its transverse pivot toward vertical position, tensioned coil spring means reacting against said base and biasing said leg toward its vertical position, the amount of tension in said coil spring means substantially counterbalancing the weight of said forward portion of the projector, and roller anti-friction means on the free end of said leg for facilitating the rotating action of said leg under spring tension to change the elevation of the forward portion of said base relative to said pair of contacts.

2. In an optical projector having an objective lens system for focusing the projected image, a base adapted to support the projector in the position to which the base is tilted comprising a main framework, a pair of contacts projecting downwardly from said framework about which said framework is adapted to tilt, an extensible bed for supporting said objective lens system slidably carried by said framework, an elevator leg pivoted to said bed on a transverse axis for supporting said objective lens system at increasingly higher elevations relative to said pair of contacts as said leg is swung about its transverse pivot toward vertical position, and tension coil spring means reacting against said bed and biasing said leg toward its vertical position, the amount of tension in said coil spring substantially counterbalancing the weight of the extended base.

3. In an optical projector having an objective lens system for focusing the projected image, a base adapted to support the projector in the position to which the base is tilted comprising a main framework, a pair of contacts projecting downwardly from said framework about which said framework is adapted to tilt, an extensible bed for supporting said objective lens system slidably carried by said framework, an elevator leg pivoted to said bed on a transverse axis for elevating said bed upon movement of the leg toward vertical position, and tension coil spring means reacting against said bed and biasing said leg toward its vertical position, the amount of tension in said coil spring substantially counter-balancing the weight of the extended base, the free end of said elevator leg being provided with roller anti-friction means for facilitating pivotal movement of said leg toward and from its vertical position.

References Cited in the file of this patent

UNITED STATES PATENTS

| | | |
|---|---|---|
| 1,392,207 | Ott | Sept. 27, 1921 |
| 1,991,493 | Cornelius | Feb. 19, 1935 |
| 2,525,534 | Ernisse | Oct. 10, 1950 |
| 2,793,563 | Koskela | May 28, 1957 |
| 2,939,659 | Koskela | June 7, 1960 |

FOREIGN PATENTS

| | | |
|---|---|---|
| 210,496 | Australia | Sept. 19, 1957 |